United States Patent [19]

Urushidani et al.

[11] Patent Number: 5,272,637
[45] Date of Patent: Dec. 21, 1993

[54] METHOD AND APPARATUS FOR CONTROLLING THE SUPPLY OF FUEL TO A GAS TURBINE DURING LOAD REJECTION

[75] Inventors: Haruo Urushidani; Tomo Sato, both of Hitachi; Kazuhiko Kumata, Katsuta; Tetsuo Sasada, Hitachi; Koji Takahashi, Hitachi; Akira Shimura, Hitachi; Seiichi Kirikami, Hitachi; Isao Sato, Hitachi; Hideaki Kaneda, Katsuta, all of Japan

[73] Assignee: Hitachi, Ltd., Tokyo, Japan

[21] Appl. No.: 670,196

[22] Filed: Mar. 15, 1991

[30] Foreign Application Priority Data

Mar. 19, 1990 [JP] Japan ................. 2-067091

[51] Int. Cl.$^5$ ............................. F02C 9/26
[52] U.S. Cl. ................... 364/431.02; 60/243; 60/39.281
[58] Field of Search ........ 364/431.01, 431.02, 364/182; 60/243, 39.281; 318/592, 594

[56] References Cited

U.S. PATENT DOCUMENTS

| | | | |
|---|---|---|---|
| 3,657,524 | 4/1972 | Bakke | 364/182 |
| 3,987,620 | 10/1976 | Giordano et al. | 364/175 X |
| 4,035,624 | 7/1977 | Lardi | 364/182 X |
| 4,296,600 | 10/1981 | Abo et al. | 364/431.02 X |
| 4,341,071 | 7/1982 | Abo et al. | 60/39.141 |
| 4,380,894 | 4/1983 | Abo et al. | 364/431.02 X |
| 4,697,238 | 9/1987 | Barbeau | 364/431.02 |
| 4,901,625 | 2/1990 | Busson et al. | 364/182 X |
| 4,995,232 | 2/1991 | Sutton | 60/243 |

FOREIGN PATENT DOCUMENTS 2635993 3/1991 Fed. Rep. of Germany .

OTHER PUBLICATIONS

W. I. Rowen, "Simplified Methematical Representations of Heavy-Duty Gas Turbines," Journal of Engineering for Power, Oct. 1983, vol. 105, pp. 865-869.

Primary Examiner—Thomas G. Black
Assistant Examiner—Collin W. Park
Attorney, Agent, or Firm—Antonelli, Terry, Stout & Kraus

[57] ABSTRACT

A fuel supply amount is controlled while the load of a gas turbine is changed so that the fuel supply amount is shifted to a fuel supply amount in accordance with the changed load. A fuel supply control valve is operated at high speed during an initial stage and operated at a lower speed as the fuel supply amount necessary for the changed load is reached. Therefore flameout of a combustor is prevented without increasing the number of revolutions of the gas turbine over a certain upper limit.

1 Claim, 5 Drawing Sheets

METHOD AND APPARATUS FOR CONTROLLING THE SUPPLY OF FUEL TO A GAS TURBINE DURING LOAD REJECTION

BACKGROUND OF THE INVENTION

This invention relates to a method and to an apparatus for controlling fuel of a gas turbine and, more particularly, relates to a method and to an apparatus for controlling fuel at the time of load rejection or FCB (first cut back).

In machinery combining power and load or in a combination plant of a generator and a prime mover serving as power source, for example, load rejection is when the load of the generator is reduced abruptly down to zero or a certain fixed load while keeping a ordinary or normal number of revolutions. In the event of such load rejection, it becomes necessary to control the prime mover to supply thereto less energy.

For example, in rotary machine such as a steam turbine, with load rejection, generated energy is converted to rotational energy to bring about an increase in the number of revolutions if the steam supply is not decreased. However, the rotary machine has an upper limit with the number of revolutions which is decided by the allowable stress of its material so that it is necessary to control the steam supply valve to be closed or opened at a proper opening for the purpose of preventing the number of revolutions from exceeding the upper limit. On the other hand, as the load rejection takes place in the gas turbine, it becomes necessary to reduce the fuel supplied to the gas turbine for the same reason as described above. It is noted here that the gas turbine is constructed in general by a compressor, a combustor and a turbine. Fuel is injected into the combustor to be burned with air compressed to high pressure by the compressor. The combustion gas is then expanded in the turbine to generate or perform work. Accordingly, since it is necessary to produce compressed air by the compressor at all times in order to maintain a constant number of revolutions of the gas turbine, work must be performed by the turbine by an amount corresponding to compression work even in the state of no load. Thus, it becomes necessary to inject a prescribed quantity of fuel even if the turbine is operated with no load. Further, in the combustor of the gas turbine, combustion cannot take place as the flow rate of fuel to be supplied to the combustor falls below a certain limit, resulting in a phenomenon known as flameout. Such flameout results in the air containing combustible matter and flowing downstream to be in an extremely dangerous state. For this reason, it is one of the necessary functions of the fuel flow rate control valve controlling apparatus to rapidly reduce the time required from the opening of the fuel flow rate control valve during normal operation to the opening of the fuel flow rate control value at which the fuel flow rate corresponds to no load operation without causing the flameout phenomenon and incurring a excessive number of revolutions at the time of load rejection.

FIG. 3 shows an example by a block diagram of a conventional fuel flow control system. In this system, an output W detected by an output detector 6 attached and belonging to a load 9 is compared with a set output W* as a desired or target value by a comparator 1 and is then converted into a desired number of revolutions N* by an arithmetic unit 2 in accordance with an output deviation $\Delta W$ thus obtained. In the gas turbine, this conversion function is usually set at 104% when a rated output is the desired value and at 100% for no load. The desired number of revolutions N* is increased at a predetermined fixed rate when the output deviation $\Delta W$ is positive, and N* is decreased at a predetermined fixed rate when $\Delta W$ is negative.

However, when no power is required for the load 9, it is set at 100%.

A number of revolutions N detected by a revolution detector 7 belonging to a gas turbine 8 is compared with the desired number of revolutions N* by a comparator 3, and an output $\Delta N$ thus obtained is converted into the desired opening $\theta_0$ of fuel flow rate control valve by an arithmetic unit 4.

An arithmetic unit 5 calculates the minimum value of the desired opening of a fuel flow rate control valve 12 to set the opening of the fuel flow rate control valve within a range that can prevent a combustor 14 from causing a flameout. The flameout of the combustor 14 happens depending on the characteristics of the combustor; it takes place when the fuel air ratio becomes equal to or less than a certain predetermined value Since the flow rate of the air discharged from a compressor 13 to be supplied to the combustor 14 varies in accordance with the atmospheric temperature and the number of revolutions, the arithmetic unit 5 corrects for the minimum value of the desired opening of the fuel control valve 12 in response to the atmospheric temperature T detected by an atmospheric temperature detector 11 and number of revolutions N.

A pressure control valve 17 keeps constant an inlet pressure $P_2$ of the fuel flow rate control valve 12 detected by a pressure detector 18. Therefore, the fuel flow rate which decides the output (power) of the gas turbine is determined uniquely by the opening of the fuel flow rate control valve 12.

In accordance with the change of $\theta_1$ which is the output of the arithmetic unit 5, the opening of the fuel flow rate control valve 12 is varied to change of the fuel flow rate and, thereby makes the output W approach the set output W*. In this way, a prescribed feedback control is performed.

Here, FIG. 4 shows the behavior of the above conventional control system in the case that load is rejected or the set output W* for the load 9 becomes zero from the rated value in substantially an instant.

Description will be given below of FIG. 4. It is assumed that the load rejection takes place at a point of time $T_1$. The set output W* changes from point $A_1$ to point $A_3$ via point $A_2$. Assuming that A and B are constants, the calculation is done in the arithmetic unit 4 based on the following formula;

$$\theta_0 = A \times (N^* - N) + B$$

Values for B correspond to lines g and h, for example, conditions without load.

A value for the desired minimum valve opening corresponding to line e is set in the arithmetic unit 5. Therefore, the desired fuel flow rate control valve opening $\theta_1$ changes from point $B_1$ to point $B_3$ via point $B_2$, thereafter, passes through point $B_4$ and asymptotically approaches line g. The opening of the fuel flow rate control valve 12 changes from point $C_1$ to point $C_3$ via point P, and thereafter, gets to line h in accordance with the change of the desired opening. The output (power) W of the gas turbine changes along a line equivalent to line c. During the period $t_1$ in which the output of the gas turbine is not less than zero after the load is rejected at point $T_1$, the number of revolutions N rises temporarily form point $D_1$ to point $D_2$, and however, it tends to drop as the opening of the fuel flow rate control valve 12 settles down to line d and, thereafter, settled down to line h.

In this way, the output W responds to the change of the set output W*.

According to this controlling method, however, the minimum opening of the valve becomes less than the minimum set value for the desired or target opening value, resulting in that fuel is supplied to the combustor only at the rate below the desired fuel flow rate. To cope with this, the limit can be fixed beforehand, which must be fixed to line f in actuality, to line e obtained by upwardly correcting by an amount of difference $\Delta B$ corresponding to a difference $\Delta C$ between lines d and b. However, this measure gives rise to a problem that the rise of the number of revolutions is further promoted at the time of load rejection so that it cannot be regarded as a solution.

OBJECT AND SUMMARY OF THE INVENTION

The present invention has been made in view of the above problem, and an object thereof is to provide a method and an apparatus for controlling fuel of a gas turbine which are capable of preventing the flameout of a combustor without permitting the opening of a fuel flow rate control valve to be less than a preset limit at the time of load rejection, while minimizing the rise of the number of revolutions.

To this end, there is provided according to the present invention a method for controlling fuel of a gas turbine in which a fuel supply control valve is controlled to control the amount of fuel supply to a combustor in proportion to the magnitude of load. The method comprises the steps of, when shifting the fuel supply amount that is to a fuel supply amount agreeable with changed load when load of the gas turbine has been changed, operating the fuel supply control valve at a high speed at the time of starting the control, and operating the fuel supply control valve at a lower speed than the high speed at a time near to when the fuel supply amount necessary for the changed load is reached.

In accordance with the controlling method of the present invention, when the fuel supply amount required for the changed load is approached, the desired opening command, and the opening and closing speed of the control valve are lowered. In consequence, its undershooting of the control valve is reduced and, hence, the flameout in the combustor is prevented without causing a rise of the number of revolution of the gas turbine over a certain limit.

According to this invention, the above-mentioned object is accomplished, as well, by an apparatus for controlling fuel of a gas turbine comprising:

a fuel control valve for controlling an amount of fuel supply to a combustor; and a valve opening command means for issuing an opening command to said fuel control valve according to a magnitude of load of the turbine, wherein combustion is performed in accordance with the load of the gas turbine, and said valve opening command means has a correction command means for operating said fuel control valve at high speed during an initial stage of opening and closing operation thereof and at lower speed than said high speed near the desired opening value.

DETAILED DESCRIPTION OF PREFERRED EMBODIMENTS

Figure 1:
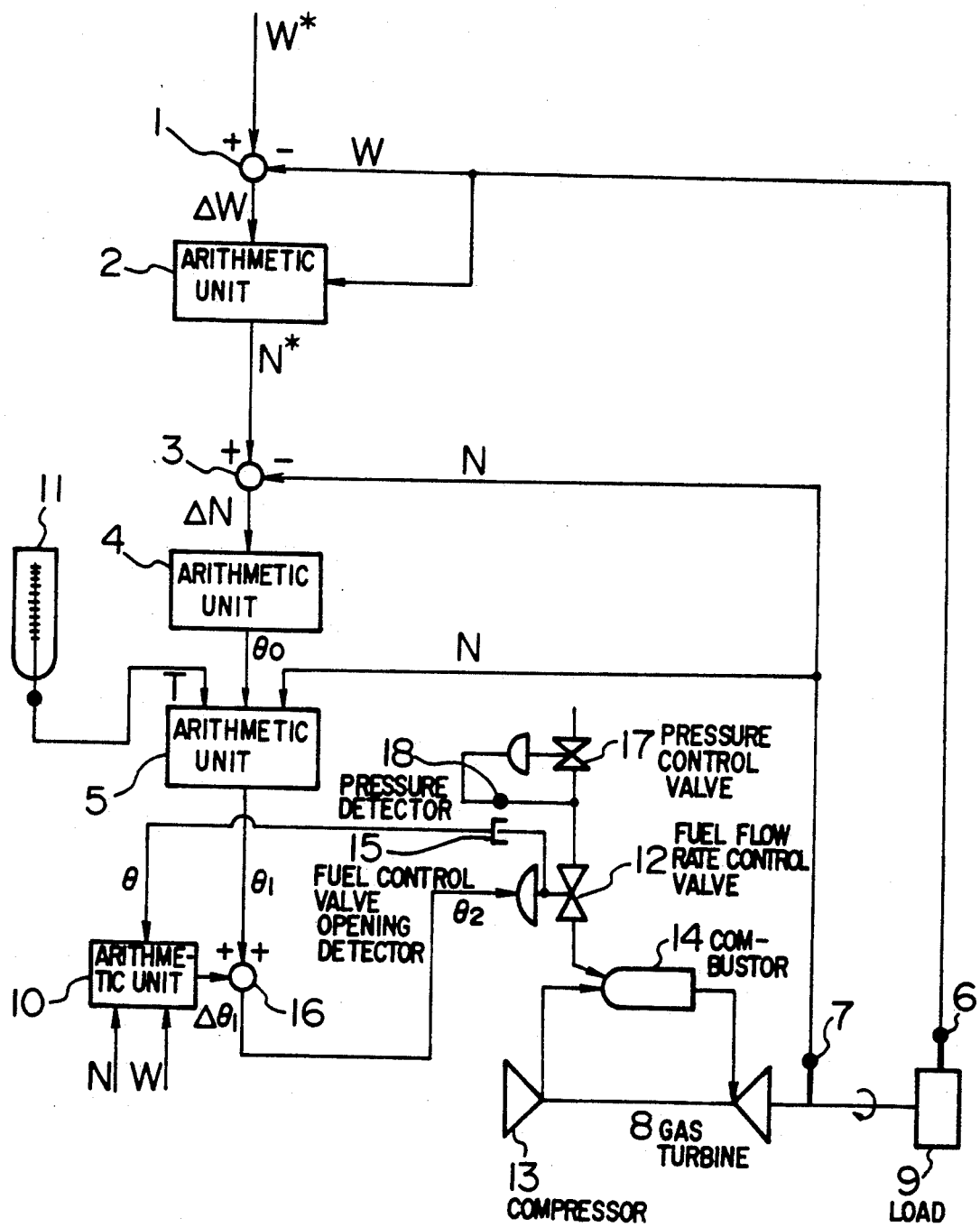
FIG. 1 is a block diagram of a gas turbine control system for explanation of a fuel controlling method according to a preferred embodiment of the present invention.

A description is given below of an embodiment of the present invention with reference to FIG. 1. An output W detected by an output detector belonging to a load 9 is compared with a set output W* as a desired or target value by comparator 1 and is then converted into a desired number of revolutions N* by an arithmetic unit 2 in accordance with an output deviation $\Delta W$ thus obtained. In the gas turbine, this conversion function is designed to be usually set at 104% for the case where the rated output thereof is the desired value and at 100% for the case of no load; N* is increased at a predetermined fixed rate when the output deviation $\Delta W$ is positive and is decreased at a predetermined fixed rate when $\Delta W$ is negative. However, when no power is required for the load 9, it is set at 100%. A number of revolutions N detected by a revolution detector 7 belonging to a gas turbine 8 is compared with the desired number of revolutions N* by a comparator 3, and an output $\Delta N$ thus obtained is converted into a desired opening $\theta_0$ of fuel flow rate control valve by an arithmetic unit 4.

Figure 2:
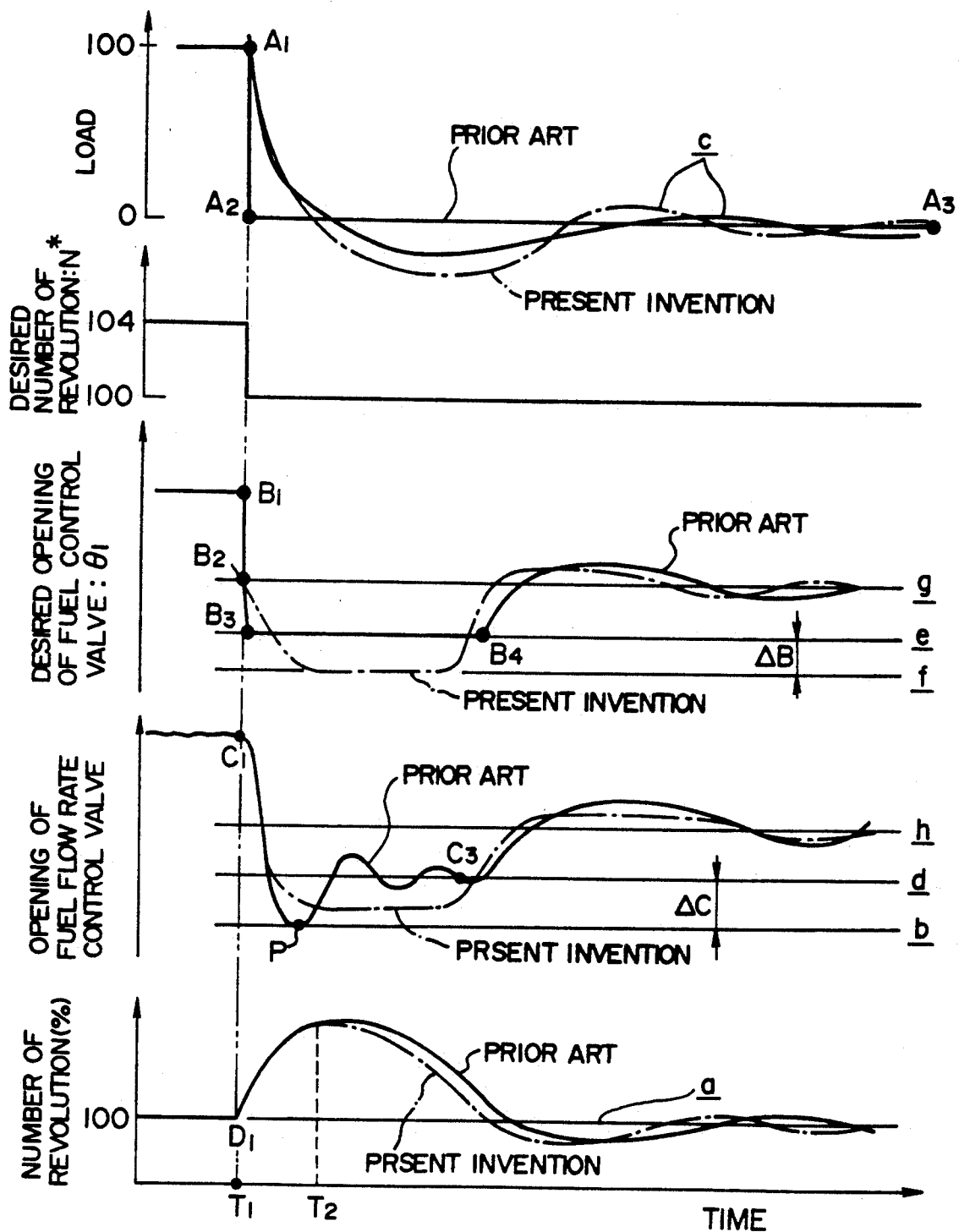
FIG. 2 is a graph showing characteristic curves obtained when a gas turbine is started.
Figure 3:
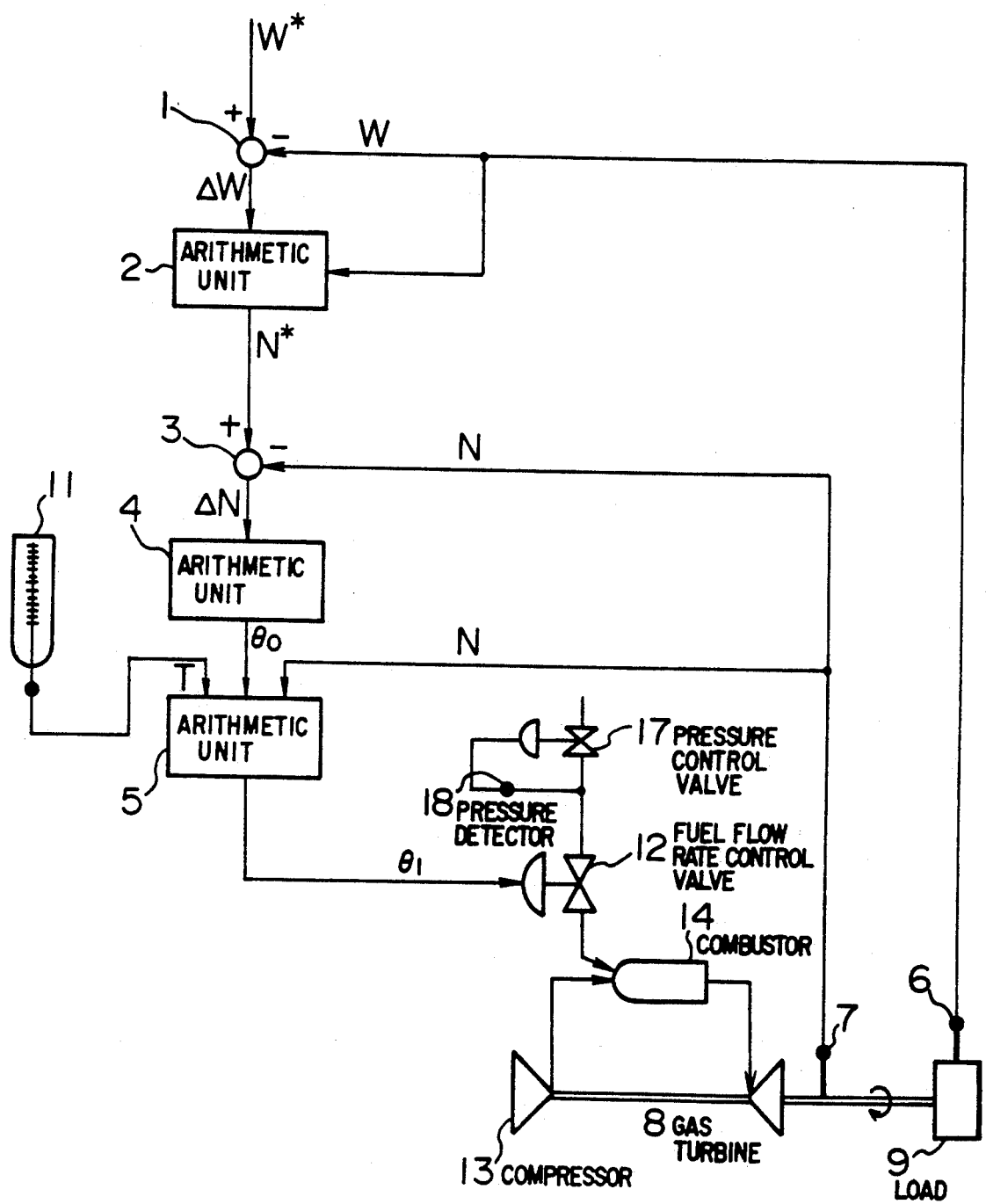
FIG. 3 is a block diagram of a gas turbine control system for explanation of a conventional fuel controlling method.
Figure 4:
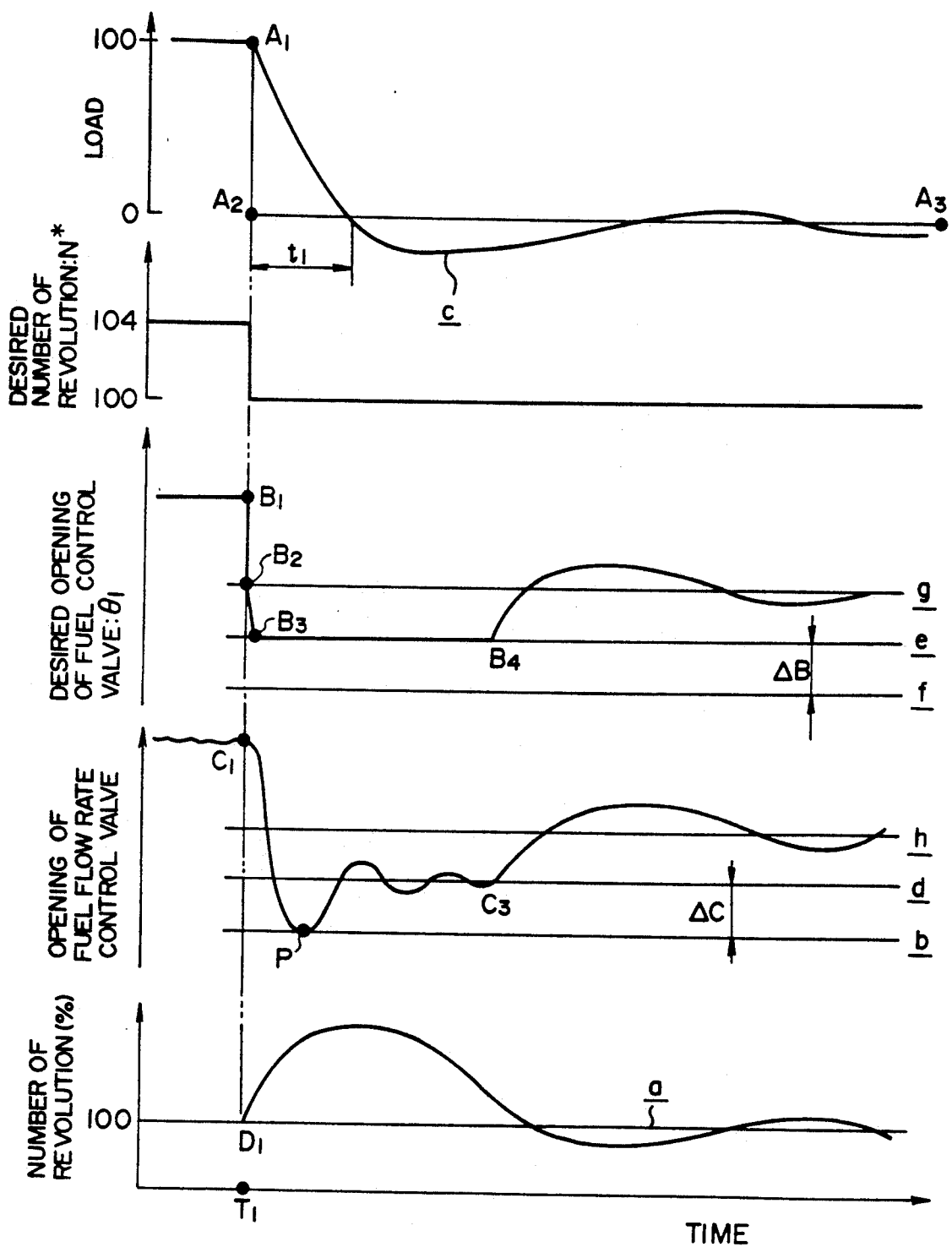
FIG. 4 is a graph showing characteristic curves obtained when a conventional gas turbine is started.
Figure 5:
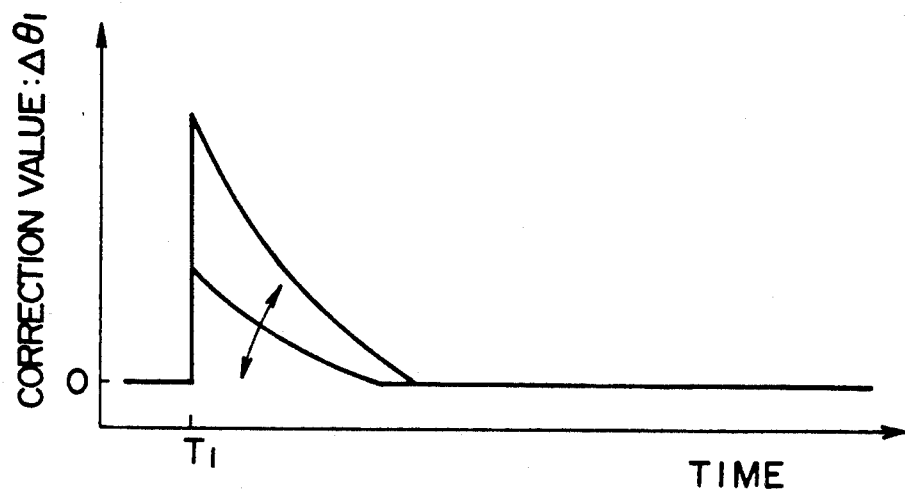
FIGS. 5 and 6 are diagrammatic views showing correction values for the desired opening of a fuel flow rate control valve according to the preferred embodiment of the present invention.

An arithmetic unit 5 calculates the minimum value of the desired opening of a fuel flow rate control valve 12, where the opening of the fuel flow rate control valve corresponding to the blowout or flameout fuel flow rate of a combustor 14 is set. The blowout or flameout of the combustor 14 will take place depending on the characteristic of the combustor; it takes place when the fuel air ratio becomes equal to or less than a certain given level. On the other hand, the flow rate of air discharged from a compressor 13 and supplied to the combustor 14 varies in accordance with the atmospheric temperature and the number of revolutions. Therefore, the minimum value of the desired opening of the fuel control valve 12 calculated by the arithmetic unit 5 is corrected in accordance with the atmospheric temperature T detected by an atmospheric temperature detector 11 and the number of revolutions N. In an arithmetic unit 10, a series of feedback controls is performed such that a time-dependent correction factor $\Delta \theta_1$ determined by a method to be explained later from parameters including a valve opening $\theta$ detected by a fuel flow rate control valve opening detector 15, are added to a desired opening $\theta_1$ of the fuel flow rate control valve 12 by an adder 16; and, finally, $\theta_2$ is a desired opening of the fuel flow rate control valve, thereby enabling the output to approach the set output W* in accordance with $\theta_2$. Here, FIG. 2 shows the behavior in which the load is rejected; for example, the set output W* necessary for the load 9 becomes zero from the rated value in substantially an instant. In this drawing, the behavior due to the controlling method of a preferred embodiment of the present invention is compared with the behavior due to the conventional control system. Further, FIG. 5 shows an example of the correction value $\Delta\theta_1$. In this drawing, the correction value $\Delta\theta_1$ is expressed as $\Delta\theta_1 = f(\theta(T_1),\text{ time})$ assuming that $\theta(T_1)$ represents the fuel flow rate control valve opening $\theta$ at time $T_1$. Namely, this correction value $\Delta\theta_1$ makes the correction to decrease the valve opening speed. In case the correction value $\Delta\theta_1$ is used, it is possible to make the opening of the fuel flow rate control valve asymptotically and smoothly approach the line b which corresponds to the minimum desired opening of the fuel flow rate control valve without undershooting as indicated by point P in the conventional controlling method. It is also possible to express the correction value $\Delta\theta_1$ using the gas turbine output W at time $T_1$ as a parameter. In this case, the correction value $\Delta\theta_1$ is expressed by the formula below:

$$\Delta\theta_1 = f(W(T_1),\text{ time}).$$

Further, the correction value can be determined without difficulty by computer simulation with a model of the gas turbine 8, other devices and the controlling apparatus. When the correction value $\Delta\theta_1$ is expressed as $\Delta\theta_1 = f(W(T_1),\text{ time})$, assuming that, for example, $$\Delta\theta_1 = b \times W(T_1) - a \times (T - T_1)$$

where "a" and "b" are constants. The computer simulation can be performed while determining the values of "a" and "b" so that the maximum value of the first term of the above formula does not exceed the valve opening of the fuel control valve at time $T_1$, and the correction amount becomes zero before time $T_2$ at the latest; the number of revolutions is maximized after the load rejection, decreasing the fuel supply as much as possible. This is equally applicable to other cases using other polynominal expressions or other functions for $\Delta\theta_1$, and, in these cases, the accuracy of the results is judged by the prevention of undershooting of the opening of the fuel control valve; or the prevention of the undershooting of fuel air ratio.

Figure 6:
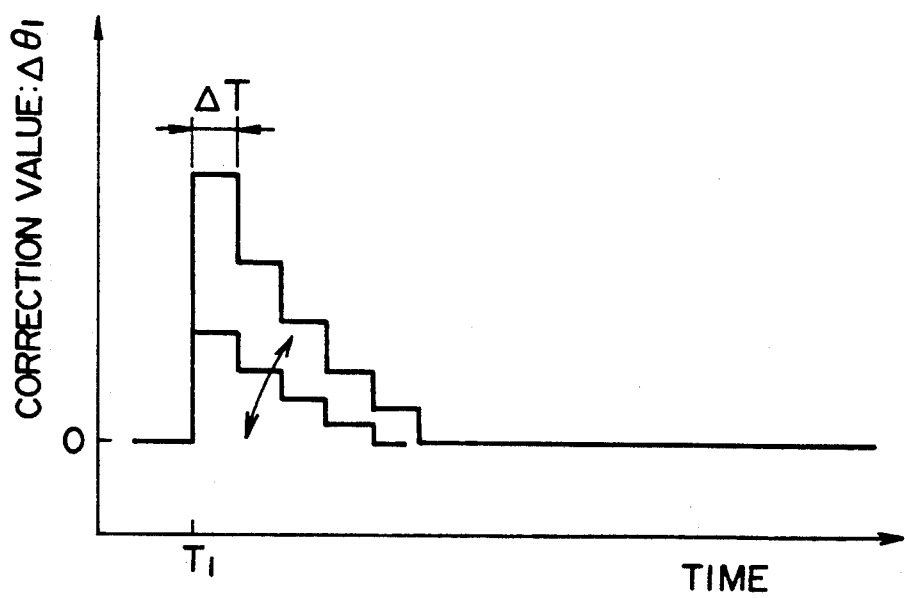

The above-mentioned embodiments of the present invention is realized by either analog electronic circuits or a digital computer. FIG. 6 shows an example of the correction value $\Delta\theta_1$ while using the digital computer. In this case, outputs are produced at every sampling time $\Delta T$ so that the correction value is expressed as $\Delta\theta = f(\theta(T_1),\text{ time})$ being like the correction value shown in FIG. 5 but having staircase-like values.

As has been described above, according to the present invention by making the fuel supply amount immediately respond to the value of the required low-load fuel supply amount when the load is reduced abruptly, the fuel control valve is closed at high speed until the required low-load fuel supply amount is reached halfway, and, thereafter, closed at lower speed than initially according to correction. Therefore, when approaching the fuel supply amount required for the changed load, that is, the desired or target opening value, the opening and closing speed of the control valve can be lowered. In consequence, it is possible to reduce the undershooting of the control valve and, hence, it is possible to sufficiently prevent occurrence of a flameout in the combustor without causing a rise of the number of revolution of the gas turbine over a certain limit.

What is claimed is:

1. An apparatus for controlling fuel of a gas turbine having a fuel controlling function during a time period of a load rejection with an arithmetic unit comprising a fuel flow rate control system of the gas turbine, said apparatus comprising:

a fuel control valve for controlling a fuel flow rate of the gas turbine;

a pressure control valve for controlling an inlet pressure of said fuel control valve;

a revolution detecting means for detecting a number of revolutions of the gas turbine to produce a first signal;

a first arithmetic unit converting an output request for the gas turbine to a second signal of a desired number of revolutions;

a second arithmetic unit for setting a desired opening value for said fuel control valve based on a deviation between said first signal of detected number of revolutions of the gas turbine and said second signal of the desired number of revolutions;

a limiter arithmetic unit for setting a minimum value of said desired opening value for the fuel control valve based on the number of revolutions of the ga turbine and atmospheric temperature; and a corrective arithmetic unit for setting a correction value for the minimum value of said desired opening value for the fuel control valve, wherein said correction value is set during a time period from occurrence of the load rejection to a time when the number of revolutions of the gas turbine reaches the maximum value after the load rejection, and said corrective arithmetic unit sets the correction value in accordance with one of a signal corresponding to a measured opening of said fuel flow rate control valve and a load signal.

* * * * *